UNITED STATES PATENT OFFICE.

LEO VIGNON, OF LYONS, FRANCE.

PROCESS OF OBTAINING COLORING-MATTER FROM AMIDOAZO-BENZOLE AND HOMOLOGUES.

SPECIFICATION forming part of Letters Patent No. 319,646, dated June 9, 1885.

Application filed July 25, 1884. (No specimens.)

*To all whom it may concern:*

Be it known that I, LEO VIGNON, of the city of Lyons, in the Department of the Rhone, in France, have invented certain new and useful Improvements in the Manufacture of Coloring-Matter for Dyers, of which the following is a specification.

The object of the present invention is to obtain brown, black, blue, violet, or red coloring-matters for use in dyeing and printing textile fibers, and particularly cotton. These coloring-matters are obtained, generally speaking, by submitting to a reduction or dissolving action amidoazo-benzole and its homologues, (amidoazo-toluol and amidoazo-benzotoluol, &c.,) and their products of substitution, (sulphoamidoazo-benzole, &c.,) and subsequently oxidizing the solution thus obtained.

Several processes may be employed for reducing the amidoazo-benzole. I will only mention the use of iron and of acetic acid, the use of zinc or tin and of hydrochloric acid, the use of an acid solution of sulphureted hydrogen, &c., it being well understood that I may employ for the purpose any of the methods of reduction known in chemistry. In this manner colorless bases are obtained which by oxidation are capable of forming coloring-matters the shade of which varies from a reddish violet to a greenish blue and from black to chestnut.

Among the oxidizing agents which may be employed advantageously I will mention the following: bichromate of potash, perchloride of iron, permanganate of potash, bioxide of baryum, free oxygen, atmospheric air, and in general nearly all oxidizing agents. The coloring-matters obtained have great affinity for cotton. They have the property of enduring washing in alkaline solutions and the influence of air and of light.

I will in the following give an example of one of the various modes in which the new coloring-matter may be prepared. A mixture of one hundred parts of chlorhydrate of amidoazo-benzole, four hundred parts of hydrochloric acid, and five hundred parts of water is heated to from 140° to 176° Fahrenheit. Then I gradually add to the liquid while stirring it a solution of sulphide of sodium until the reduction becomes complete—that is to say, until all the chlorhydrate of amidoazo-benzole is dissolved and the liquid contains no other insoluble matter than a sediment of sulphur. The liquid, which at the beginning of the operation was of a dark-red color, has at this moment become nearly colorless. I then filter the mass in order to eliminate the sulphur. The filtered liquid contains the new material in an acid solution. It is only necessary now to oxidize this liquid to produce the coloring-matter. For this purpose I gradually add a solution of perchloride of iron until the intensity of the color formed does not increase any more.

The liquid thus obtained may be advantageously used without any further manipulation for dyeing cotton after the latter has been prepared by means of a suitable mordant. I can even dip the skeins of cotton after they have been subjected to the action of a mordant into the acid solution of the base, in which case the oxygen of the air is sufficient to develop the color while the skeins are being dried. In this case the solution of the base is used exactly in the manner of an indigo-dyeing solution; or, if preferred, the coloring-matter can be precipitated, dried, and reduced to powder.

I am aware that a coloring-matter has been produced by the reaction of diazo-sulphonic acid, dimethyl-aniline, and ammonia, with sulphide of ammonium, and finally with ferric chloride, and this I do not claim; but What I do claim, and desire to secure by Letters Patent, is—

The process herein described of producing coloring-matter, the same consisting in heating a solution composed of chlorhydrate of amidoazo-benzole, hydrochloric acid, and water to from 140° to 176° Fahrenheit, then gradually adding sulphide of sodium in solution until reduction becomes complete, then filtering to remove the sediment from the liquid, and, finally, oxidizing the liquid, substantially as and for the purpose specified.

In testimony whereof I have signed this specification in the presence of two subscribing witnesses.

LEO VIGNON.

Witnesses:
M. P. PEIXOTTO,
JEAN P. A. MARTIN.